(12) United States Patent
Kim et al.

(10) Patent No.: US 8,023,945 B2
(45) Date of Patent: Sep. 20, 2011

(54) METHOD OF RELEASING LINK CONNECTION AFTER HANDOVER IN MULTI-MODE MOBILE TERMINAL AND TERMINAL THEREOF

(75) Inventors: Yong Ho Kim, Gyeonggi-do (KR); Yong Won Kwak, Gyeonggi-do (KR); Jin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 504 days.

(21) Appl. No.: 11/816,619

(22) PCT Filed: Feb. 17, 2006

(86) PCT No.: PCT/KR2006/000555
§ 371 (c)(1),
(2), (4) Date: Sep. 16, 2008

(87) PCT Pub. No.: WO2006/088331
PCT Pub. Date: Aug. 24, 2006

(65) Prior Publication Data
US 2009/0017822 A1    Jan. 15, 2009

(30) Foreign Application Priority Data
Feb. 18, 2005 (KR) .................. 10-2005-0013493

(51) Int. Cl.
*H04W 36/00* (2009.01)
(52) U.S. Cl. .............. 455/436; 455/435.1; 455/438; 455/437; 455/432.1; 370/331; 370/278; 370/461; 370/328
(58) Field of Classification Search .......... 455/436, 455/435.1, 438, 437, 432.1; 370/331, 278, 370/469, 328
See application file for complete search history.

(56) References Cited

U.S. PATENT DOCUMENTS

| 6,400,946 | B1 | 6/2002 | Vazvan et al. |
| 2002/0187784 | A1 | 12/2002 | Tigerstedt et al. |
| 2003/0125026 | A1 | 7/2003 | Tsunehara et al. |
| 2003/0125028 | A1 | 7/2003 | Reynolds |
| 2005/0249161 | A1* | 11/2005 | Carlton .................. 370/331 |

(Continued)

FOREIGN PATENT DOCUMENTS

CN    1200637    12/1998

(Continued)

OTHER PUBLICATIONS

D. Johnston, "802.21, L2 Triggers—A Strawman Proposal," 802. 21_IETF_Mobopts_r1, Mar. 2004.

(Continued)

*Primary Examiner* — Kwasi Karikari
(74) *Attorney, Agent, or Firm* — Lee, Hong, Degerman, Kang & Waimey (57) ABSTRACT

The present invention relates to a method of releasing a network connection with a link of a medium access control layer previously accessed before performing a handover to a heterogeneous network in a mobile terminal configured with a multi-mode (e.g., interface between IEEE802.16 and IEEE802.il, interface between IEEE802.16 and 3GPP/3GPP2 or interface between IEEE802.il and 3gPP/3GPP2). In a multi-mode mobile terminal, the present invention includes the steps of creating a connection with a new link, generating a trigger event indicating a connection creation with the new link, and generating a trigger event instructing a connection release from an old link.

7 Claims, 8 Drawing Sheets

U.S. PATENT DOCUMENTS

| | | | |
|---|---|---|---|
| 2006/0092864 A1* | 5/2006 | Gupta et al. | 370/278 |
| 2006/0099948 A1* | 5/2006 | Hoghooghi et al. | 455/436 |
| 2006/0140150 A1* | 6/2006 | Olvera-Hernandez et al. | 370/331 |
| 2006/0153235 A1* | 7/2006 | Kiernan et al. | 370/469 |

FOREIGN PATENT DOCUMENTS

| | | |
|---|---|---|
| CN | 1521972 | 8/2004 |
| CN | 1571322 | 1/2005 |
| WO | 2005/002250 | 1/2005 |

OTHER PUBLICATIONS

Peretz Feder et al., "MIH Proposal", IEEE 802.21 session #6, DCN:21-05-00202-00-0000$_{13}$MIH_Proposal_Lucent Phase II, Jan. 9, 2005.

Gupta et al., "Media Independent Handover", IEEE 802.21, Jan. 14, 2005.

* cited by examiner

METHOD OF RELEASING LINK CONNECTION AFTER HANDOVER IN MULTI-MODE MOBILE TERMINAL AND TERMINAL THEREOF

TECHNICAL FIELD

The present invention relates to a multi-mode mobile terminal, and more particularly, to a method of releasing a network connection with a link of a medium access control layer previously accessed before performing a handover to a heterogeneous network in a mobile terminal configured with a multi-mode (e.g., interface between IEEE802.16 and IEEE802.11, interface between IEEE802.16 and 3GPP/3GPP2 or interface between IEEE802.11 and 3gPP/3GPP2).

BACKGROUND ART

Generally, the object of IEEE802.21 in progress for International Standardization of inter-heterogeneous-network media independent handover is to enhance user's convenience for mobile terminal devices by providing seamless handover and service continuity between heterogeneous networks. MIH function, event trigger, command service and information service (IS) are defined as basic requirements.

A mobile subscriber station is a multi-mode node that supports at least two interface types. And, an interface can be implemented in various types. For instance, a wire-line type interface such as 802.3-based Ethernet, a wireless interface type based on IEEE802.XX such as IEEE802.11, IEEE802.15, IEEE802.16 and the like, an interface type defined by cellular standardization organization such as 3GPP and 3GPP2 and the like are possible.

Figure 1:
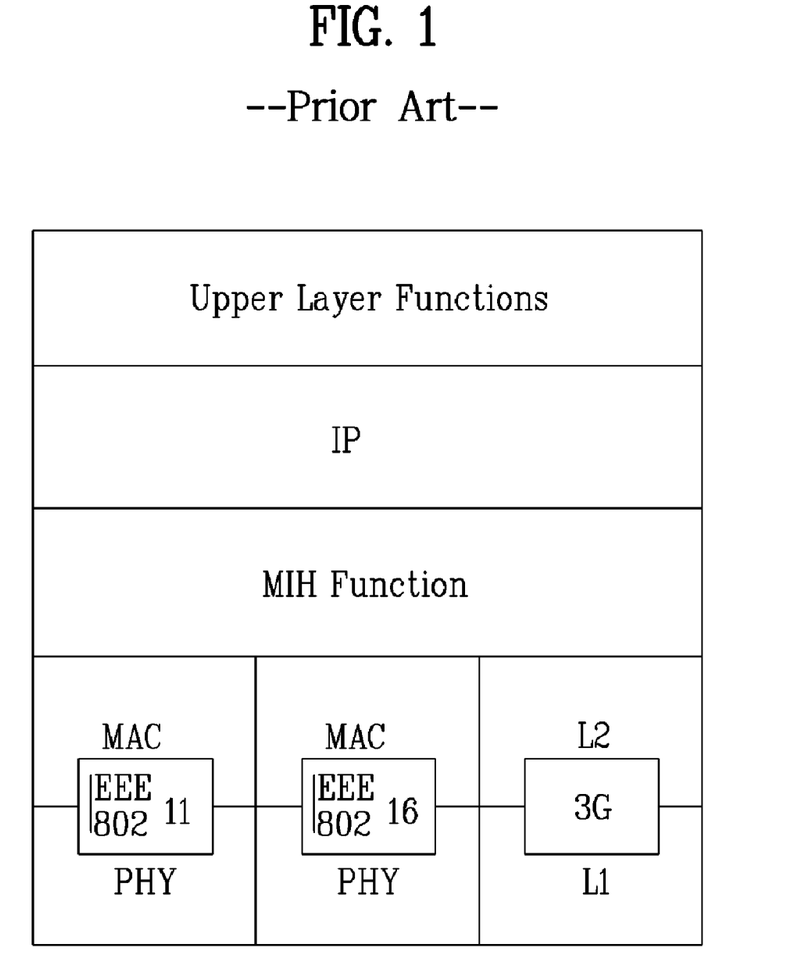
FIG. 1 is a diagram of protocol architecture of a multi-mode mobile subscriber station.

FIG. 1 is a diagram of protocol architecture of a multi-mode mobile subscriber station. Referring to FIG. 1, a multi-mode mobile subscriber station has a physical layer per mode and a medium access control layer per mode. And, an MIH layer lies below an IP layer.

Media independent handover (MIH) should be defined between IEEE802-series interfaces or between the 802-series interfaces such as the above-mentioned non-802-series interfaces defined by the cellular standardization organization such as 3GPP and 3GPP2. And, a mobility supporting protocol of an upper layer such as Mobile IP and SIP (session initiation protocol) should be supported for the seamless handover service.

MIH function is placed below an IP layer and facilitates a handover handling process using a trigger event and an input value from a second layer (Layer 2) such as information of other networks and the like. The MIH function can include input values based on user policy and configuration that can put influence on a handover process, and general interfaces are defined between the MIH function and a third layer (Layer 3) entity such as Mobile IP and SIP. These interfaces provide information about a first layer (Layer 1) (physical layer), the second layer (Layer 2) (MAC layer) and mobility management, and the MIH acquires information about lower layers and network with the help of the event and information service.

Figure 2:
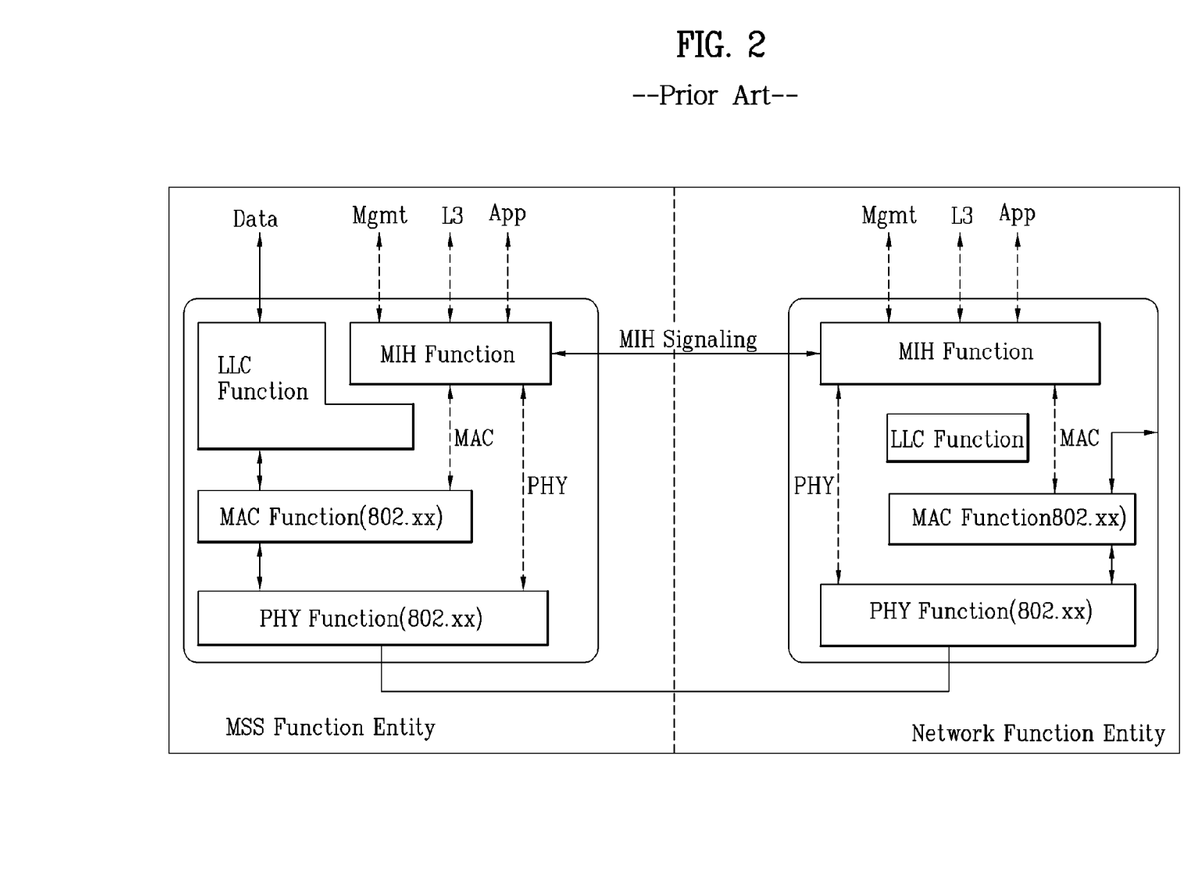
FIG. 2 is a diagram of functional entities and transport protocol of a terminal including an MIH function and a network.

Hence, the MIH function should be placed in a higher layer to monitor and control statuses of other links within the mobile subscriber station. FIG. 2 is a diagram of functional entities and transport protocol of a terminal including an MIH function and a network, in which dotted lines indicate a primitive, an event trigger and the like.

For fast handover, a network layer needs to use information from a link layer to re-establish a connection as soon as possible. A link layer event helps to estimate a user's movement and may help a mobile subscriber station and network to prepare handover in advance.

Figure 3:
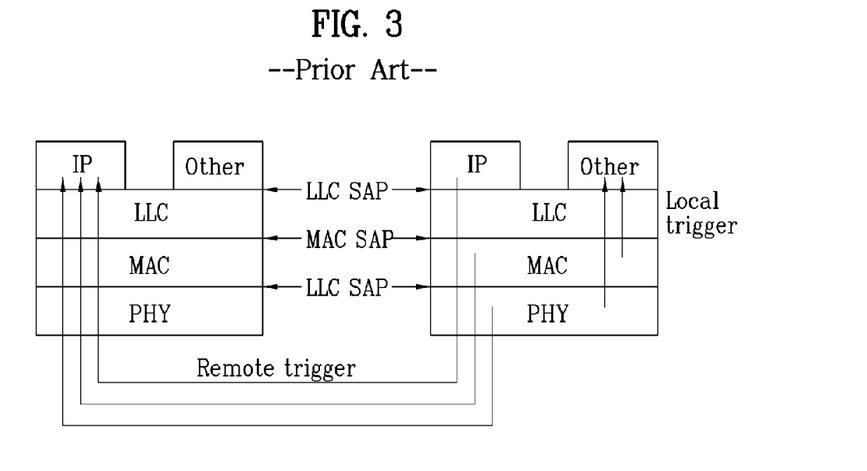
FIG. 3 is a diagram of a trigger model.

A trigger for handover may start from a physical layer (PHY) and a medium access control layer (MAC). An origin of this trigger may be a local stack or a remote stack. FIG. 3 is a diagram of a trigger model.

An event trigger provides a state of a current signal, a state change of another network and an estimated change and also provides a change between a physical layer and a medium access control layer and attribute changes of a specific network.

Event types can be classified into PHY layer event, MAC layer event, Management event, L3 event, Application event and the like.

A basic trigger event is explained as follows.

First of all, 'Link_Up' occurs in case that a Layer 2 connection is established on a specific link interface and in case that L3 packets can be transferred from a higher layer. In this case, it is decided that all L2 configurations configuring the link are completed. And, event origins are 'Local MAC' and 'Remote MAC'. Parameters of 'Link_Up' are shown in Table 1.

TABLE 1

| Name | Type | Description |
| --- | --- | --- |
| EventSource | EVENT_LAYER_TYPE | Origin from which event is generated |
| EventDestination | EVENT_LAYER_TYPE | Destination to which event shall be delivered |
| MacMobileTerminal | MAC Address | MAC address of MSS |
| MacOldAccessRouter | MAC Address | MAC address of old access router |
| MacNewAccessRouter | MAC Address | MAC address of new access router |
| NetworkIdentifier | Media Specific | Network Identifier usable in detecting change of subnet |

'Link Down' occurs in case that an L2 connection is released on a specific interface and in case that it is unable to transfer L3 packets anymore. And, an event origin is 'Local MAC'. Parameters of 'Link Down' are shown in Table 2.

TABLE 2

| Name | Type | Description |
| --- | --- | --- |
| EventSource | EVENT_LAYER_TYPE | Origin from which event is generated |
| EventDestination | EVENT_LAYER_TYPE | Destination to which event shall be delivered |
| MacMobileTerminal | MAC Address | MAC address of MSS |
| MacOldAccessRouter | MAC Address | MAC address of old access router |
| ReasonCode | | Reason why link is released |

'Link_Going_Down' occurs in case that it is estimated that an L2 connection is going to link down within a specific time. And, 'Link Going Down' may be a signal for initializing a handover procedure. Event origins are 'Local MAC' and 'Remote MAC'. And, parameters of 'Link_Going_Down' are shown in Table 3.

TABLE 3

| Name | Type | Description |
| --- | --- | --- |
| EventSource | EVENT_LAYER_TYPE | Origin from which event is generated |
| EventDestination | EVENT_LAYER_TYPE | Destination to which event shall be delivered |
| MacMobileTerminal | MAC Address | MAC address of MSS |
| MacOldAccessRouter | MAC Address | MAC address of old access router |
| MacNewAccessRouter | MAC Address | MAC address of new access router |
| TimeInterval | Time in msecs | Estimated time for Link_Down |
| ConfidenceLevel | % | Estimated level for Link_Down of link in a specific time |
| UniqueEventIdentifier | | Used in case that Event rollback occurs |

'Link_Going_Up' occurs in case that it is estimated that an L2 connection is going to 'link up' within a specific time. And, 'Link Going Up' is used in case that it takes a long time for a network to be initialized. Event origins are 'Local MAC' and 'Remote MAC'. And, parameters of 'Link_Going_Up' are shown in Table 4.

TABLE 4

| Name | Type | Description |
| --- | --- | --- |
| EventSource | EVENT_LAYER_TYPE | Origin from which event is generated |
| EventDestination | EVENT_LAYER_TYPE | Destination to which event shall be delivered |
| MacMobileTerminal | MAC Address | MAC address of MSS |
| MacOldAccessRouter | MAC Address | MAC address of old access router |
| MacNewAccessRouter | MAC Address | MAC address of new access router |
| TimeInterval | Time in msecs | Estimated time for Link_Up |
| ConfidenceLevel | % | Estimated level for Link_Up of link in a specific time |
| UniqueEventIdentifier | | Used in case that Event rollback occurs |

'Link_Event_Rollback' is combined with 'Ling_Going_Up' or 'Link_Going_Down' to use. It is a trigger occurring in case that 'Ling_Going_Up' or 'Link_Going_Down' is estimated not to occur within a specific time anymore despite that 'Ling_Going_Up' or 'Link_Going_Down' is transmitted. Event origins are 'Local MAC' and 'Remote MAC'. Table 5 shows parameters of 'Link_Event_Rollback'.

TABLE 5

| Name | Type | Description |
| --- | --- | --- |
| EventSource | EVENT_LAYER_TYPE | Origin from which event is generated |
| EventDestination | EVENT_LAYER_TYPE | Destination to which event shall be delivered |
| MacMobileTerminal | MAC Address | MAC address of MSS |
| MacNewAccessRouter | MAC Address | MAC address of new access router |
| UniqueEventIdentifier | | Used in case that Event rollback occurs |

'Link_Available' indicates that a new specific link is usable or available. 'Link_Available' indicates possibility that a new base station or access point can provide a link quality better than that of a base station or access point currently accessed by a mobile subscriber station. Event origins are 'Local MAC' and 'Remote MAC'. And, parameters of 'Link_Available' are shown in Table 6.

TABLE 6

| Name | Type | Description |
| --- | --- | --- |
| EventSource | EVENT_LAYER_TYPE | Origin from which event is generated |
| EventDestination | EVENT_LAYER_TYPE | Destination to which event shall be delivered |
| MacMobileTerminal | MAC Address | MAC address of MSS |
| MacNewAccessRouter | MAC Address | MAC address of new access router |
| MacOldAccessRouter | MAC Address | MAC address of old access router |

'Link_Parameters_Change' is an event occurring in case that a variation of a link parameter value exceeds a specific limit. This can include a link layer parameter such as a link speed, QoS (quality of service), encryption value and the like. Event origins are 'Local MAC' and 'Remote MAC'. And, parameters of 'Link_Parameters_Change' are shown in Table 7.

TABLE 7

| Name | Type | Description |
| --- | --- | --- |
| EventSource | EVENT_LAYER_TYPE | Origin from which event is generated |
| EventDestination | EVENT_LAYER_TYPE | Destination to which event shall be delivered |
| MacMobileTerminal | MAC Address | MAC address of MSS |
| MacAccessRouter | MAC Address | MAC address of current access router |
| oldValueOfLinkParameter | | Old value of link parameter |
| newValueOfLinkParameter | | New value of link parameter |

Figure 4:
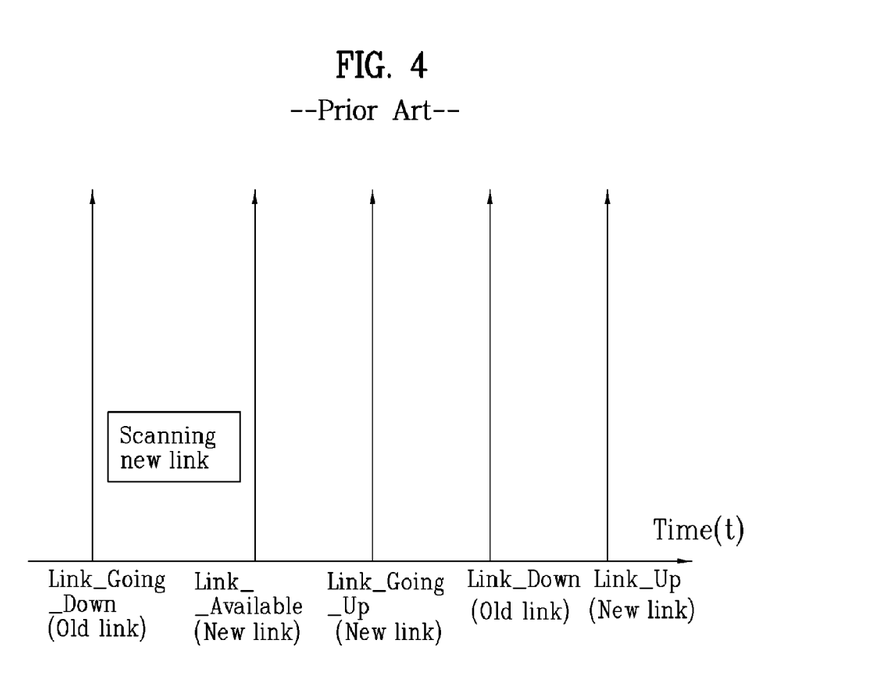
FIG. 4 is an exemplary diagram of a trigger occurring until a new link is created since a quality of link currently accessed by a mobile subscriber station is degraded.

FIG. 4 is an exemplary diagram of a trigger occurring until a new link is created since a quality of link currently accessed by a mobile subscriber station is degraded.

Information Service provides detailed information for a network necessary for network discovery and selection and should be accessible by any kind of network. The information service should include information elements such as link access parameter, security mechanism, neighbor map, location, service provider and other access information, cost of link and the like.

'Mobile IPv4' is explained as follows.

First of all, a configuration of network supporting Mobile IP includes a home agent, a foreign agent and a mobile terminal. For operation of Mobile IP, functions of agent discovery, registration, routing, temporary address (CoA) and the like are required. Each of theses functions are explained as follows.

First of all, agent discovery is a method that a mobile terminal decides whether it is connected to a home network or located at a foreign network. By this method, the mobile terminal is able to detect that it has been moved away into another network.

The registration function provides flexible mechanism enabling a mobile terminal to be provided with a service, which has been provided to the mobile terminal on a home network, on a new network by delivering current location information to a home agent in case that the mobile terminal detects that it has been moved away into another network.

The routing function is needed to appropriately perform routing on datagram to be transmitted/received by a mobile terminal in case that the mobile terminal is connected to a foreign network.

The temporary address (CoA) function is to establish a temporary address in case that a mobile terminal is moved away into another subnet. The temporary address function can provide temporary address possibility by two kinds of methods 'FA-CoA' and 'co-located CoA'. The 'FA-CoA' method is provided by a foreign agent via an agent advertisement message, and an IP address of the foreign agent is used as a temporary address. The 'co-located CoA' method is a method that a temporary address is allocated to a moving node via a DHCP server located at a foreign network.

The basic object of Mobile IPv4 is to support transparent mobility of an upper layer and needs additional functions of mobile host, home agent and foreign agent. Yet, in case of not using path optimization, a change of a correspondent node communicating with a mobile terminal is unnecessary. In this case, the mobile host represents an IP host supported by mobility. The home agent is a router that sustains location information for the mobile host and performs tunneling. And, the foreign agent means a router supporting mobility in a foreign network.

Figure 5:
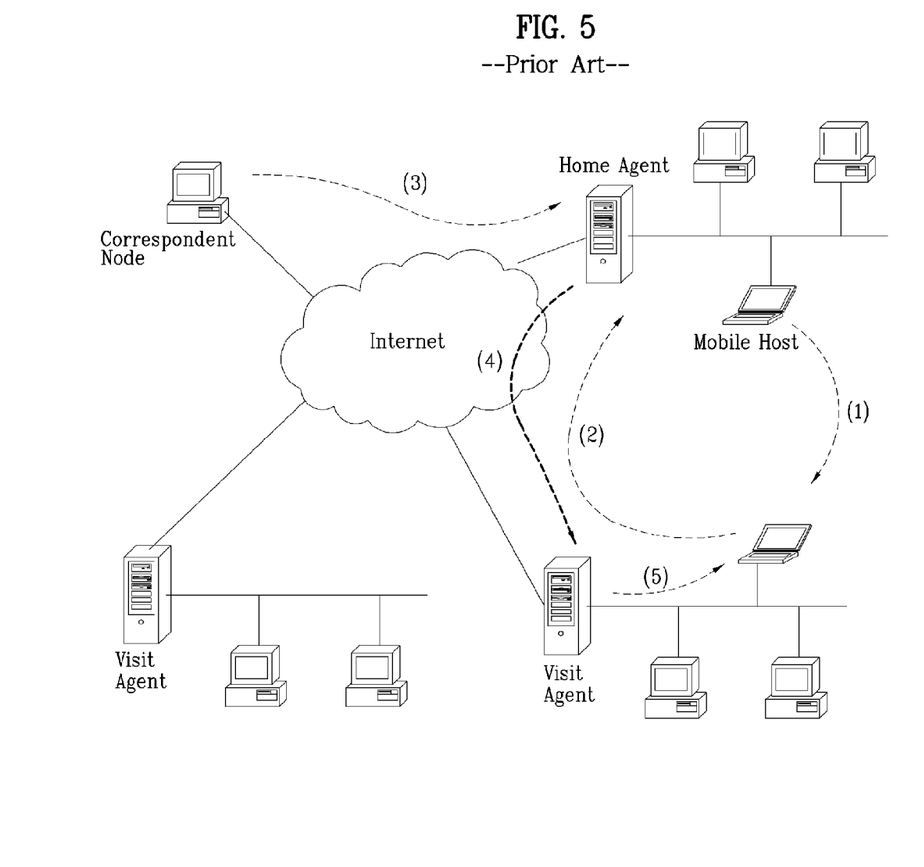
FIG. 5 is a diagram for explaining basic actions in Mobile IPv4.

FIG. 5 is a diagram for explaining basic operations in Mobile IPv4. Operations in the respective steps of FIG. 5 are explained as follows.

(1) In case that a mobile host moves away into a foreign network from its home network, the mobile host recognizes that it has moved by receiving an advertisement message broadcast from the foreign network and then registers a temporary address (CoA) indicating its current location to a home agent in the home network.

(2) In this case, CoA is an IP address (FA-CoA) of a foreign agent or an address allocated to the mobile host via DHCP or the like by the foreign network. Packets sent to the mobile host from outside are transferred to the home network and these packets are picked up by a home agent recognizing a movement of a mobile terminal.

(3) The home agent encapsulates a packet delivered to the mobile host by targeting an address of FA as a destination and then delivers it to the foreign agent.

(4) The delivered encapsulated packet is recovered into an initial delivery packet by being de-capsulated by the foreign agent and is then delivered to the mobile host finally.

(5) The packet to be delivered to a correspondent host from the mobile host can be directly delivered via the foreign agent or can be delivered using a reverse tunnel in case of a problem of ingress filtering.

A medium access control (MAC) layer of a multi-mode mobile terminal transmits 'Link_Going_Down' trigger to MIH if a signal quality of a currently connected link is degraded. The medium access control layer then executes a scanning process. In doing so, if a new link is searched from a medium access control layer of another interface, a process for releasing a connection with a previously connected link is necessary after creation of link. Yet, it is unable to perform this process with a conventional trigger only.

DISCLOSURE OF INVENTION

Accordingly, the present invention is directed to a method of releasing a link after handover of a mobile terminal that substantially obviate one or more of the problems due to limitations and disadvantages of the related art.

An object of the present invention is to provide a method of releasing a link after handover of a mobile terminal, by which an access to a previous link and a connection to a network can be efficiently released after an access to a new link by a handover execution in a multi-mode mobile terminal.

Another object of the present invention is to provide a mobile terminal, by which the above object can be achieved.

To achieve these and other advantages and in accordance with the purpose of the present invention, in a multi-mode mobile terminal, a method of releasing a link after handover execution of a mobile terminal according to the present invention includes the steps of creating a connection with a new link, generating a trigger event indicating a connection creation with the new link, and generating a trigger event instructing a connection release from an old link.

In another aspect of the present invention, a mobile terminal includes a medium access control (MAC) layer of a new link generating a trigger event indicating a connection creation with the new link by handover, a handover function entity generating a trigger event instructing a connection release from an old link by receiving the trigger event indicating the connection creation with the new link, a medium access control layer of the old link releasing a connection with the old link by receiving the trigger event indicating the connection creation with the new link, and a network layer transmitting a deregistration request message to a point of attachment for the old or new link by receiving the trigger event indicating the connection creation with the new link.

Preferably, after the trigger event indicating the connection creation with the new link has been generated, the method can further include the step of releasing a connection from the old link.

Preferably, the trigger event indicating the connection creation with the new link is generated from a medium access control (MAC) layer of the new link and the trigger event indicating the connection creation with the new link is delivered to a handover function entity. Moreover, the handover function entity is a media independent handover (MIH) function entity.

Preferably, the trigger event instructing the connection release from the old link is generated from the MIH function entity. And, the trigger event instructing the connection release from the old link is delivered to a medium access control layer and a network layer of the old link.

Preferably, the method further includes the steps of transmitting a deregistration request message to a point of attachment for the old link from the network layer of the old link and delivering the deregistration request message to a home agent from the point of attachment for the old link.

BEST MODE FOR CARRYING OUT THE INVENTION

The aforesaid objectives, features and advantages of the invention will be set forth in the description which follows, and in part will be apparent from the description. Reference will now be made in detail to one preferred embodiment of the present invention, examples of which are illustrated in the accompanying drawings.

Figure 6:
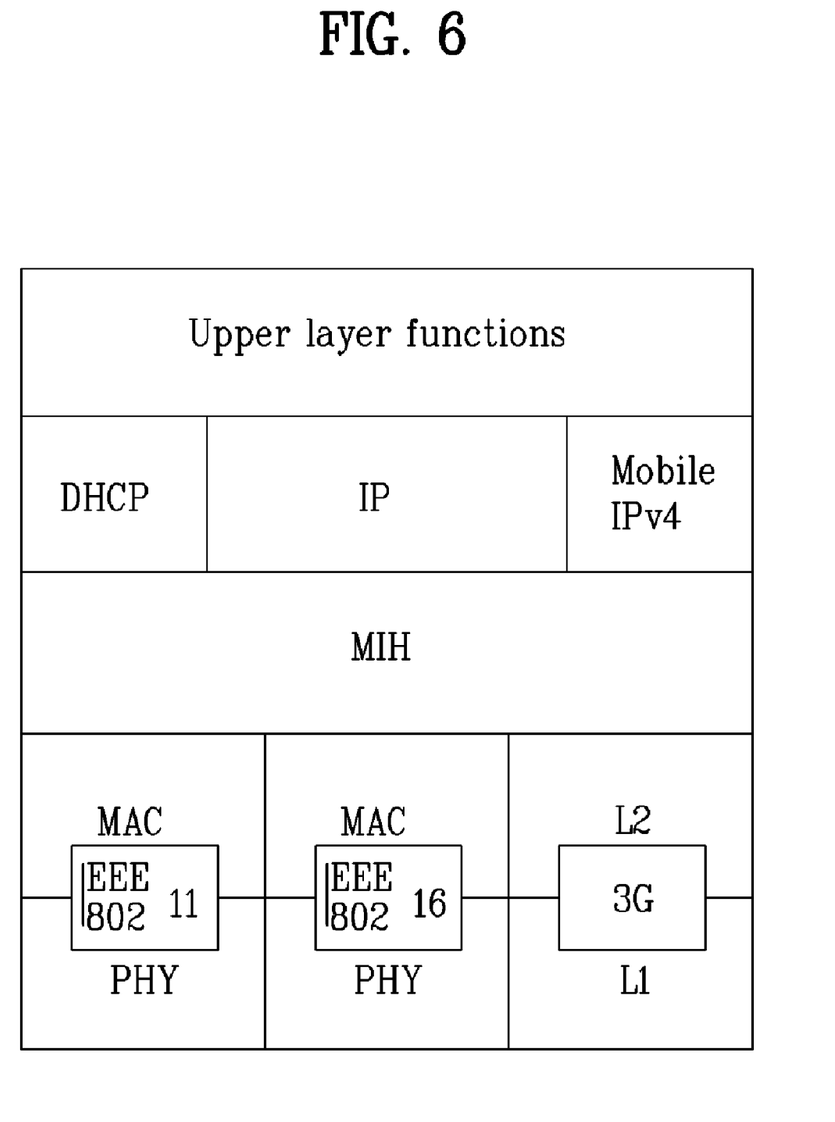
FIG. 6 is a diagram of a protocol stack of a mobile terminal having IP mobility management protocol.
Figure 7:
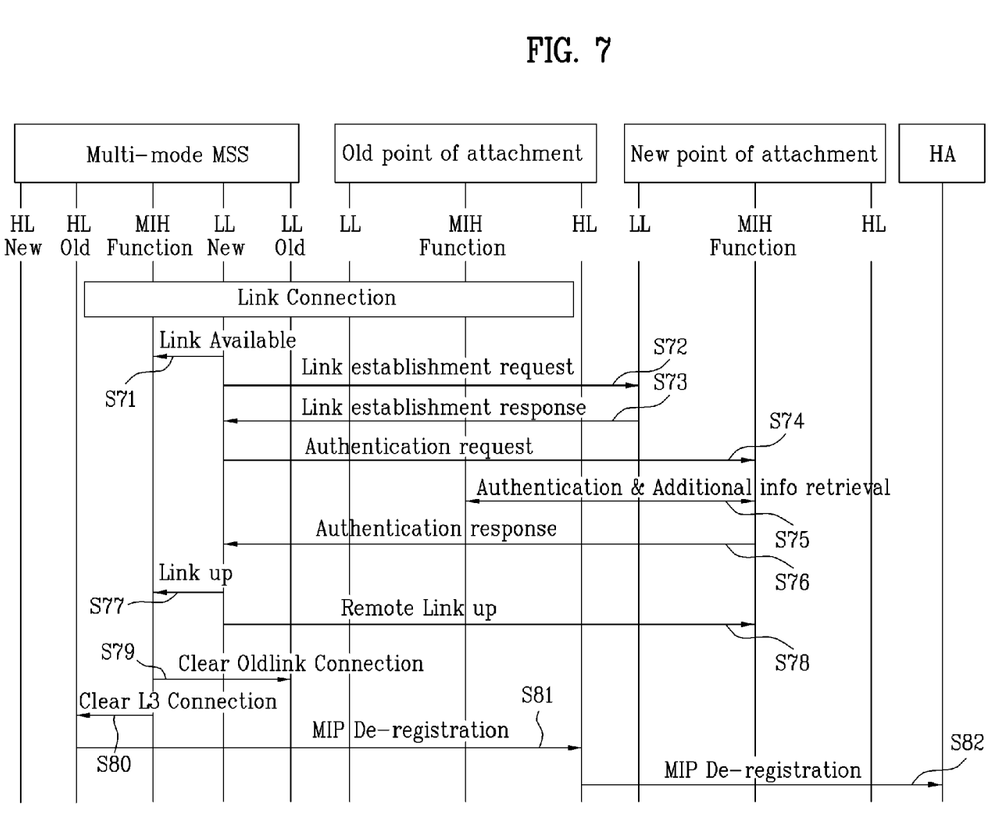
FIG. 7 is a flowchart according to one preferred embodiment of the present invention.

FIG. 6 shows a protocol stack of a mobile terminal having an IP mobility management protocol. In an embodiment of FIG. 6, DHCP (dynamic host configuration protocol) and Mobile IPv4 are exemplarily shown as the mobility management protocol. Alternatively, at least two protocols can be placed as a combination of IP mobile management protocols. FIG. 7 is a flowchart according to one preferred embodiment of the present invention.

An MIH function entity of a multi-mode mobile terminal receives a trigger event 'Link_Available', which indicates that a link of a new interface is usable, from a medium access control layer (LL new) of a new link if a link quality of a currently accessed interface is degraded [S71]. The MIH function entity then executes a connection creation procedure with the new link [S72-S76].

Once the connection creation procedure with the new link is completed, the medium access control layer (LL new) of the new interface link generates and delivers a trigger event 'Link_Up' indicating that a link is established with the MIH function entity of the mobile terminal and an MIH function entity of an access point for the new link [S77, S78].

Having received the trigger event 'Link_Up' from the medium access control layer of the new link, the MIH function entity of the mobile terminal generates trigger events 'Clear_Oldlink_Connection' and 'Clear_L3_Connection' to release a connection created with a previous link and then delivers them to a previous medium access control layer (LL old) and a previous network layer (HL old), respectively [S79, S80].

Table 8 and Table 9 show examples of parameters configuring trigger events 'Clear_Oldlink_Connection' and 'Clear_L3_Connection', respectively.

TABLE 8

| Name | Type | Description |
| --- | --- | --- |
| EventSource | EVENT_LAYER_TYPE | Origin from which event is generated |
| EventDestination | EVENT_LAYER_TYPE | Destination to which event shall be delivered |
| MacMobileTerminal | MAC Address | MAC address of MSS |

TABLE 9

| Name | Type | Description |
| --- | --- | --- |
| EventSource | EVENT_LAYER_TYPE | Origin from which event is generated |
| EventDestination | EVENT_LAYER_TYPE | Destination to which event shall be delivered |
| Network ID | IP Address | Network address accessed by MSS in a previous link |

Having received the trigger event 'Clear_Oldlink_Connection', the previous medium access control layer (LL old) of the mobile terminal releases the connection of the previous link.

Having received the trigger event 'Clear_L3_Connection', the previous network layer (HL old) of the mobile terminal transmits a deregistration request (MIP De-registration) message to a home agent via a current access point to release the network connection [S81, S82].

Figure 8:
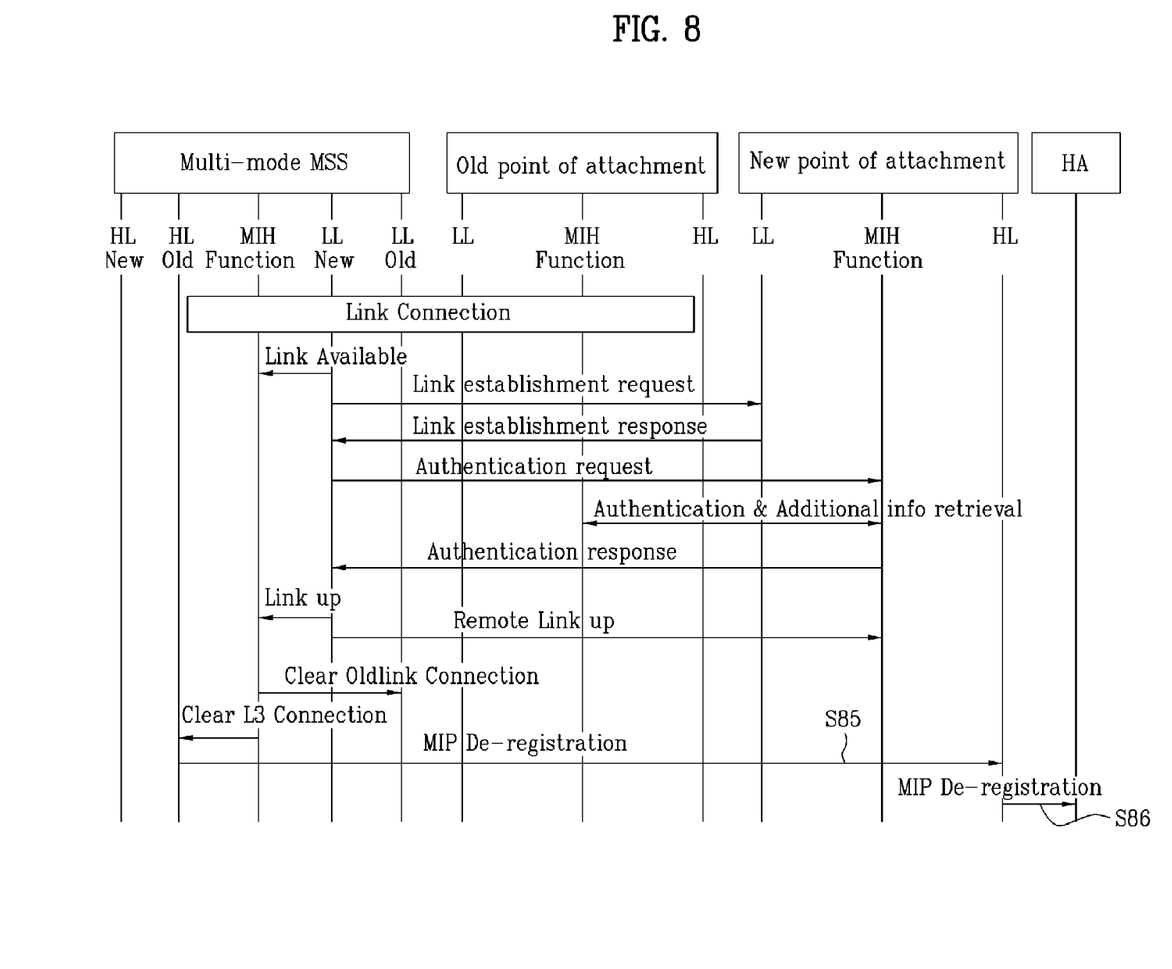
FIG. 8 is a flowchart according to another preferred embodiment of the present invention.

FIG. 8 is a flowchart according to another preferred embodiment of the present invention. In an embodiment of FIG. 8, the rest of steps except S85 and S86 are equal to those of the embodiment of FIG. 7. Namely, in the embodiment of FIG. 7, the previous network layer (HL old) of the mobile terminal releases the network connection in a manner of transmitting the de-registration request (MIP De-registration) message to the home agent via the current access point. Yet, in the embodiment of FIG. 8, the previous network layer (HL old) of the mobile terminal releases the network connection in a manner of transmitting the de-registration request (MIP De-registration) message to the home agent via a new access point.

Figure 9:
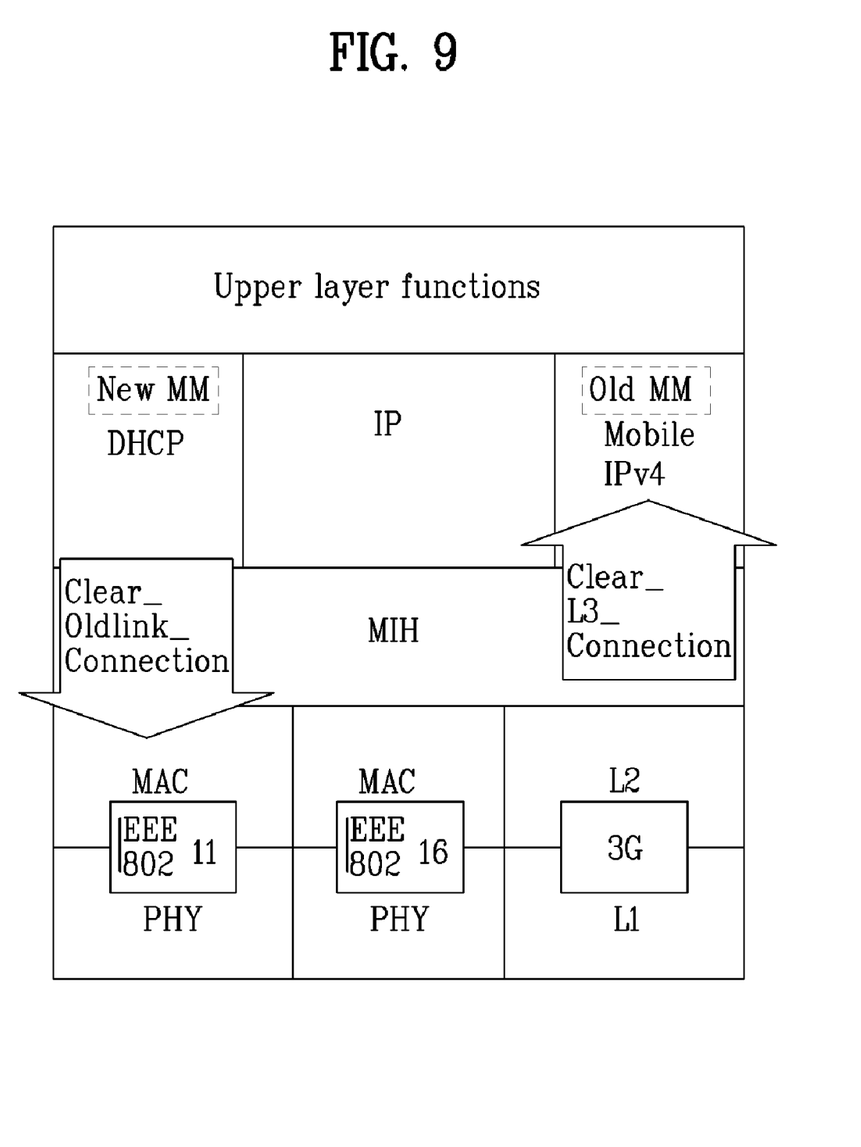
FIG. 9 is a diagram for explaining a procedure that a trigger event is delivered in case that at least two mobility management protocols exist in a protocol stack of a multi-mode mobile terminal according to the present invention.

FIG. 9 is a diagram for explaining a procedure that a trigger event is delivered in case that at least two mobility management protocols exist in a protocol stack of a multi-mode mobile terminal according to the present invention. To release a connection with a previous network after completion of accessing a new handover network, MIH enabling communications with all stacks transmits a release trigger event (Clear_Oldlink_Connection) to Layer 2 of a previous link protocol stack. If a mobility management protocol usable in a newly accessed network differs, a Layer 3 connection is released by transmitting a trigger event of releasing the Layer 3 connection used in a previously used MM to a previous MM. If mobility management protocols to be used in a new handover network is the same, it is unnecessary to deliver the trigger event 'Clear_L3_Connection' in FIG. 9.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

According to a method of releasing a link after handover after mobile terminal's handover and mobile terminal thereof, an access to a previous link and a connection to a network can be efficiently released after an access to a new link by a handover execution.

INDUSTRIAL APPLICABILITY

Accordingly, the present invention is applicable to a communication system such as a broadband wireless access system, a wireless mobile communication system and the like.

The invention claimed is:

1. A method of releasing a link after handover execution of a mobile terminal, the method performed by a multi-mode mobile terminal and comprising:
creating a first connection with a new link;
generating a first trigger event indicating a connection creation with the new link;
generating a second trigger event instructing a connection release from an old link; and
releasing a second connection from the old link, wherein the releasing comprises:
transmitting a deregistration request message from a network layer of the old link to a point of attachment for the old link,
transmitting the deregistration request message from the network layer of the old link to a point of attachment for the new link when the deregistration request message is not transmitted to the point of attachment for the old link, and
delivering the deregistration request message from the point of attachment for the old link or new link to a home agent,
wherein the first trigger event is generated from a medium access control (MAC) layer of the new link and delivered to a handover function entity that is a media independent handover (MIH) function entity,
wherein the second trigger event is delivered to a medium access control layer and the network layer of the old link, and
wherein the second trigger event delivered to the network layer of the old link includes an origination field from which the second trigger event is generated, a destination field to which the second trigger event will be delivered and a network address field accessed by the mobile terminal in the old link.

2. The method of claim 1, wherein the second trigger event is generated from the MIH function entity.

3. The method of claim 1, wherein the new link and the old link are links between heterogeneous networks.

4. The method of claim 1, wherein the second event trigger delivered to the medium access control layer of the old link includes an origination field from which the second event trigger is generated, a destination field to which the second event trigger will be delivered and a MAC address field of the mobile terminal.

5. A mobile terminal comprising:
a medium access control (MAC) layer of a new link generating a first trigger event indicating a connection creation with the new link by handover;
a handover function entity generating a second trigger event instructing a connection release from an old link by receiving the first trigger event;
a medium access control layer of the old link releasing a connection with the old link by receiving the second trigger event; and
a network layer of the old link transmitting a deregistration request message to a point of attachment for the old link responsive to receiving the second trigger event, wherein the network layer of the old link transmits the deregistration request message to a point of attachment for the new link when the deregistration request message is not transmitted to the point of attachment for the old link so the deregistration request message can be delivered from the point of attachment for the old link or new link to a home agent,
wherein the handover function entity comprises a media independent handover (MIH) function entity, and
wherein the second trigger event delivered to the network layer includes an origination field from which the second trigger event is generated, a destination field to which the second trigger event will be delivered and a network address field accessed by the mobile terminal in the old link.

6. The method of claim 5, wherein the new link and the old link are links between heterogeneous networks.

7. The method of claim 5, wherein the second trigger event delivered to the medium access control layer of the old link includes an origination field from which the second trigger event is generated, a destination field to which the second trigger event will be delivered and a MAC address field of the mobile terminal.

* * * * *